(12) United States Patent
Roesch

(10) Patent No.: US 8,601,034 B2
(45) Date of Patent: Dec. 3, 2013

(54) SYSTEM AND METHOD FOR REAL TIME DATA AWARENESS

(75) Inventor: Martin Frederick Roesch, Eldersburg, MD (US)

(73) Assignee: Sourcefire, Inc., Columbia, MD (US)

( * ) Notice: Subject to any disclaimer, the term of this patent is extended or adjusted under 35 U.S.C. 154(b) by 273 days.

(21) Appl. No.: 13/046,127

(22) Filed: Mar. 11, 2011

(65) Prior Publication Data

US 2012/0233222 A1   Sep. 13, 2012

(51) Int. Cl.
*G06F 15/173* (2006.01)
*G06F 17/30* (2006.01)

(52) U.S. Cl.
USPC .......................................... 707/812; 709/224

(58) Field of Classification Search
USPC .......................................... 707/812; 709/224
See application file for complete search history.

(56) References Cited

U.S. PATENT DOCUMENTS

| | | | |
|---|---|---|---|
| 4,550,436 A | 10/1985 | Freeman | |
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,404,488 A | 4/1995 | Kerrigan et al. | |
| 5,430,842 A | 7/1995 | Thompson et al. | |
| 5,459,841 A | 10/1995 | Flora-Holmquist et al. | |
| 5,495,409 A | 2/1996 | Kanno | |
| 5,497,463 A | 3/1996 | Stein et al. | |
| 5,604,910 A | 2/1997 | Kojima et al. | |
| 5,646,997 A * | 7/1997 | Barton | 713/176 |
| 5,666,293 A | 9/1997 | Metz et al. | |
| 5,796,942 A | 8/1998 | Esbensen | |
| 5,870,554 A | 2/1999 | Grossman et al. | |
| 5,881,269 A | 3/1999 | Dobbelstein | |
| 5,901,307 A | 5/1999 | Potter et al. | |
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |

(Continued)

FOREIGN PATENT DOCUMENTS

| | | |
|---|---|---|
| EP | 1 548 998 A1 | 6/2005 |
| EP | 2166725 A1 | 3/2010 |

(Continued)

OTHER PUBLICATIONS

Final Office Action issued by the U.S. Patent Office on Dec. 9, 2011 in connection with related U.S. Appl. No. 12/688,400.

(Continued)

*Primary Examiner* — Jean M Corrielus
*Assistant Examiner* — Evan Aspinwall
(74) *Attorney, Agent, or Firm* — Posz Law Group, PLC

(57) ABSTRACT

A system includes a sensor and a processor. The sensor is configured to passively read data in packets as the packets are in motion on a network. The processor is cooperatively operable with the sensor The processor is configured to receive the read data from the sensor; and originate real-time map profiles of files and file data, both from the read data from the sensor, as the passively read packets are in motion on the network.

23 Claims, 6 Drawing Sheets

(56) References Cited

U.S. PATENT DOCUMENTS

| | | |
|---|---|---|
| 5,999,937 A | 12/1999 | Ellard |
| 6,002,427 A | 12/1999 | Kipust |
| 6,141,686 A | 10/2000 | Jackowski et al. |
| 6,199,181 B1 | 3/2001 | Rechef et al. |
| 6,219,786 B1 | 4/2001 | Cunningham et al. |
| 6,240,452 B1* | 5/2001 | Welch et al. ............... 709/224 |
| 6,259,805 B1 | 7/2001 | Freedman et al. |
| 6,321,338 B1 | 11/2001 | Porras et al. |
| 6,324,656 B1 | 11/2001 | Gleichauf et al. |
| 6,334,121 B1 | 12/2001 | Primeaux et al. |
| 6,343,362 B1 | 1/2002 | Ptacek et al. |
| 6,393,474 B1 | 5/2002 | Eichert et al. |
| 6,415,321 B1 | 7/2002 | Gleichauf et al. |
| 6,453,354 B1 | 9/2002 | Jiang et al. |
| 6,477,648 B1 | 11/2002 | Schell et al. |
| 6,487,666 B1 | 11/2002 | Shanklin et al. |
| 6,499,107 B1* | 12/2002 | Gleichauf et al. ............ 726/23 |
| 6,539,381 B1 | 3/2003 | Prasad et al. |
| 6,546,493 B1 | 4/2003 | Magdych et al. |
| 6,587,876 B1 | 7/2003 | Mahon et al. |
| 6,590,885 B1 | 7/2003 | Jorgensen |
| 6,678,734 B1 | 1/2004 | Haatainen et al. |
| 6,678,824 B1 | 1/2004 | Cannon et al. |
| 6,684,332 B1 | 1/2004 | Douglas |
| 6,711,127 B1 | 3/2004 | Gorman et al. |
| 6,754,826 B1 | 6/2004 | Challenger et al. |
| 6,766,320 B1 | 7/2004 | Wang et al. |
| 6,772,196 B1 | 8/2004 | Kirsch et al. |
| 6,789,202 B1 | 9/2004 | Ko et al. |
| 6,816,973 B1 | 11/2004 | Gleichauf et al. |
| 6,851,061 B1 | 2/2005 | Holland et al. |
| 6,957,348 B1 | 10/2005 | Flowers et al. |
| 6,983,323 B2 | 1/2006 | Cantrell et al. |
| 6,993,706 B2 | 1/2006 | Cook |
| 6,999,998 B2 | 2/2006 | Russell |
| 7,032,114 B1 | 4/2006 | Moran |
| 7,047,423 B1* | 5/2006 | Maloney et al. ............ 709/224 |
| 7,054,930 B1 | 5/2006 | Cheriton |
| 7,058,821 B1 | 6/2006 | Parekh et al. |
| 7,065,657 B1 | 6/2006 | Moran |
| 7,073,198 B1 | 7/2006 | Flowers et al. |
| 7,076,803 B2 | 7/2006 | Bruton et al. |
| 7,096,503 B1 | 8/2006 | Magdych et al. |
| 7,113,789 B1 | 9/2006 | Boehmke |
| 7,120,635 B2* | 10/2006 | Bhide et al. ............ 707/999.002 |
| 7,133,916 B2 | 11/2006 | Schunemann |
| 7,134,141 B2 | 11/2006 | Crosbie et al. |
| 7,152,105 B2 | 12/2006 | McClure et al. |
| 7,174,566 B2 | 2/2007 | Yadav |
| 7,181,769 B1 | 2/2007 | Keanini et al. |
| 7,231,665 B1 | 6/2007 | McArdle et al. |
| 7,243,148 B2 | 7/2007 | Keir et al. |
| 7,257,630 B2 | 8/2007 | Cole et al. |
| 7,305,708 B2 | 12/2007 | Norton et al. |
| 7,310,688 B1 | 12/2007 | Chin |
| 7,313,695 B2 | 12/2007 | Norton et al. |
| 7,315,801 B1 | 1/2008 | Dowd et al. |
| 7,317,693 B1 | 1/2008 | Roesch et al. |
| 7,346,922 B2 | 3/2008 | Miliefsky |
| 7,350,077 B2 | 3/2008 | Meier et al. |
| 7,363,656 B2 | 4/2008 | Weber et al. |
| 7,365,872 B2 | 4/2008 | Lawrence et al. |
| 7,467,202 B2 | 12/2008 | Savchuk |
| 7,467,205 B1 | 12/2008 | Dempster et al. |
| 7,467,410 B2 | 12/2008 | Graham et al. |
| 7,493,388 B2 | 2/2009 | Wen et al. |
| 7,496,662 B1 | 2/2009 | Roesch et al. |
| 7,496,962 B2 | 2/2009 | Roelker et al. |
| 7,519,954 B1 | 4/2009 | Beddoe et al. |
| 7,539,681 B2 | 5/2009 | Norton et al. |
| 7,580,370 B2 | 8/2009 | Boivie et al. |
| 7,594,273 B2 | 9/2009 | Keanini et al. |
| 7,596,807 B2 | 9/2009 | Ptacek et al. |
| 7,644,275 B2 | 1/2010 | Mowers et al. |
| 7,664,845 B2 | 2/2010 | Kurtz et al. |
| 7,673,043 B2 | 3/2010 | Keir et al. |
| 7,680,929 B1 | 3/2010 | Lyon |
| 7,701,945 B2 | 4/2010 | Roesch et al. |
| 7,716,742 B1 | 5/2010 | Roesch et al. |
| 7,730,011 B1 | 6/2010 | Deninger et al. |
| 7,730,175 B1 | 6/2010 | Roesch et al. |
| 7,733,803 B2 | 6/2010 | Vogel, III et al. |
| 7,801,980 B1 | 9/2010 | Roesch et al. |
| 7,805,482 B2* | 9/2010 | Schiefer ............ 709/201 |
| 7,805,762 B2 | 9/2010 | Rowland |
| 7,831,522 B1* | 11/2010 | Satish et al. ............ 705/76 |
| 7,885,190 B1 | 2/2011 | Roesch et al. |
| 7,949,732 B1 | 5/2011 | Roesch et al. |
| 8,020,211 B2 | 9/2011 | Keanini et al. |
| 8,041,773 B2 | 10/2011 | Abu-Ghazaleh et al. |
| 8,150,039 B2 | 4/2012 | de Cesare et al. |
| 8,272,055 B2 | 9/2012 | Wease |
| 8,289,882 B2 | 10/2012 | Vogel, III et al. |
| 8,433,790 B2 | 4/2013 | Polley et al. |
| 2001/0027485 A1 | 10/2001 | Ogishi et al. |
| 2001/0034847 A1 | 10/2001 | Gaul, Jr. |
| 2002/0035639 A1 | 3/2002 | Xu |
| 2002/0066034 A1 | 5/2002 | Schlossberg |
| 2002/0083344 A1 | 6/2002 | Vairavan |
| 2002/0087716 A1 | 7/2002 | Mustafa |
| 2002/0112185 A1 | 8/2002 | Hodges |
| 2002/0123995 A1 | 9/2002 | Shibuya |
| 2002/0143918 A1 | 10/2002 | Soles et al. |
| 2002/0144142 A1* | 10/2002 | Shohat ............ 713/200 |
| 2002/0165707 A1 | 11/2002 | Call |
| 2002/0168082 A1* | 11/2002 | Razdan ............ 382/100 |
| 2002/0178271 A1* | 11/2002 | Graham et al. ............ 709/229 |
| 2003/0009699 A1 | 1/2003 | Gupta et al. |
| 2003/0014662 A1 | 1/2003 | Gupta et al. |
| 2003/0046388 A1 | 3/2003 | Milliken |
| 2003/0065817 A1 | 4/2003 | Benchetrit et al. |
| 2003/0083847 A1 | 5/2003 | Schertz et al. |
| 2003/0093517 A1 | 5/2003 | Tarquini et al. |
| 2003/0101353 A1 | 5/2003 | Tarquini et al. |
| 2003/0126472 A1 | 7/2003 | Banzhof |
| 2003/0140250 A1 | 7/2003 | Taninaka et al. |
| 2003/0195874 A1 | 10/2003 | Akaboshi |
| 2003/0212779 A1 | 11/2003 | Boyter et al. |
| 2003/0212910 A1 | 11/2003 | Rowland et al. |
| 2003/0217283 A1 | 11/2003 | Hrastar et al. |
| 2003/0229726 A1 | 12/2003 | Daseke et al. |
| 2004/0010684 A1 | 1/2004 | Douglas |
| 2004/0015728 A1 | 1/2004 | Cole et al. |
| 2004/0034773 A1 | 2/2004 | Balabine et al. |
| 2004/0064726 A1 | 4/2004 | Girouard |
| 2004/0073800 A1 | 4/2004 | Shah et al. |
| 2004/0093408 A1 | 5/2004 | Hirani et al. |
| 2004/0093582 A1 | 5/2004 | Segura |
| 2004/0098618 A1 | 5/2004 | Kim et al. |
| 2004/0117478 A1* | 6/2004 | Triulzi et al. ............ 709/224 |
| 2004/0123153 A1 | 6/2004 | Wright et al. |
| 2004/0172234 A1 | 9/2004 | Dapp et al. |
| 2004/0179477 A1 | 9/2004 | Lincoln et al. |
| 2004/0193943 A1 | 9/2004 | Angelino et al. |
| 2004/0210756 A1 | 10/2004 | Mowers et al. |
| 2004/0218532 A1 | 11/2004 | Khirman |
| 2004/0221176 A1 | 11/2004 | Cole |
| 2004/0250032 A1 | 12/2004 | Ji et al. |
| 2004/0268358 A1 | 12/2004 | Darling et al. |
| 2005/0005169 A1 | 1/2005 | Kelekar |
| 2005/0015623 A1 | 1/2005 | Williams et al. |
| 2005/0044422 A1 | 2/2005 | Cantrell et al. |
| 2005/0055399 A1* | 3/2005 | Savchuk ............ 709/203 |
| 2005/0076066 A1 | 4/2005 | Stakutis et al. |
| 2005/0108393 A1 | 5/2005 | Banerjee et al. |
| 2005/0108554 A1 | 5/2005 | Rubin et al. |
| 2005/0108573 A1* | 5/2005 | Bennett et al. ............ 713/201 |
| 2005/0113941 A1 | 5/2005 | Ii et al. |
| 2005/0114700 A1 | 5/2005 | Barrie et al. |
| 2005/0160095 A1 | 7/2005 | Dick et al. |
| 2005/0172019 A1 | 8/2005 | Williamson et al. |
| 2005/0188079 A1 | 8/2005 | Motsinger et al. |
| 2005/0223014 A1 | 10/2005 | Sharma et al. |
| 2005/0229255 A1 | 10/2005 | Gula et al. |

(56) References Cited

U.S. PATENT DOCUMENTS

| | | | |
|---|---|---|---|
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 | 12/2005 | Gassoway | |
| 2005/0273857 A1 | 12/2005 | Freund | |
| 2006/0174337 A1 | 8/2006 | Bernoth | |
| 2006/0265748 A1 | 11/2006 | Potok | |
| 2006/0288053 A1 | 12/2006 | Holt et al. | |
| 2006/0294588 A1 | 12/2006 | Lahann et al. | |
| 2007/0027913 A1 | 2/2007 | Jensen et al. | |
| 2007/0058631 A1 | 3/2007 | Mortier et al. | |
| 2007/0143852 A1 | 6/2007 | Keanini et al. | |
| 2007/0162463 A1 | 7/2007 | Kester et al. | |
| 2007/0192286 A1 | 8/2007 | Norton et al. | |
| 2007/0192863 A1 | 8/2007 | Kapoor et al. | |
| 2007/0195797 A1 | 8/2007 | Patel et al. | |
| 2007/0271371 A1 | 11/2007 | Singh Ahuja | |
| 2007/0283007 A1 | 12/2007 | Keir et al. | |
| 2007/0283441 A1 | 12/2007 | Cole et al. | |
| 2007/0288579 A1 | 12/2007 | Schunemann | |
| 2008/0115213 A1 | 5/2008 | Bhatt et al. | |
| 2008/0127342 A1 | 5/2008 | Roesch et al. | |
| 2008/0133523 A1 | 6/2008 | Norton et al. | |
| 2008/0168561 A1 | 7/2008 | Durie et al. | |
| 2008/0196102 A1 | 8/2008 | Roesch | |
| 2008/0209518 A1 | 8/2008 | Sturges et al. | |
| 2008/0244741 A1 | 10/2008 | Gustafson et al. | |
| 2008/0263197 A1 | 10/2008 | Stephens | |
| 2008/0276319 A1 | 11/2008 | Rittermann | |
| 2008/0289040 A1 | 11/2008 | Ithal | |
| 2009/0019141 A1 | 1/2009 | Bush et al. | |
| 2009/0028147 A1 | 1/2009 | Russell | |
| 2009/0041020 A1 | 2/2009 | Gibbons et al. | |
| 2009/0055691 A1 | 2/2009 | Ouksel et al. | |
| 2009/0097662 A1 | 4/2009 | Olechowski et al. | |
| 2009/0164517 A1 | 6/2009 | Shields et al. | |
| 2009/0171981 A1* | 7/2009 | Shuster | 707/10 |
| 2009/0182864 A1 | 7/2009 | Khan et al. | |
| 2009/0259748 A1 | 10/2009 | McClure et al. | |
| 2009/0262659 A1 | 10/2009 | Sturges et al. | |
| 2009/0271696 A1 | 10/2009 | Bailor et al. | |
| 2009/0282481 A1 | 11/2009 | Dow et al. | |
| 2009/0307776 A1 | 12/2009 | Curnyn | |
| 2009/0320138 A1 | 12/2009 | Keanini et al. | |
| 2010/0050260 A1 | 2/2010 | Nakakoji et al. | |
| 2010/0077483 A1* | 3/2010 | Stolfo et al. | 726/24 |
| 2010/0088767 A1 | 4/2010 | Wease | |
| 2010/0161795 A1 | 6/2010 | Deridder et al. | |
| 2010/0205675 A1 | 8/2010 | Vogel, III et al. | |
| 2010/0257267 A1* | 10/2010 | Sohn et al. | 709/224 |
| 2010/0268834 A1* | 10/2010 | Eidelman et al. | 709/230 |
| 2011/0307600 A1 | 12/2011 | Polley et al. | |
| 2011/0314143 A1 | 12/2011 | Vogel, III et al. | |

FOREIGN PATENT DOCUMENTS

| | | |
|---|---|---|
| GB | 2 432 933 A | 6/2007 |
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Office Action issued by the U.S. Patent Office on Feb. 2, 2012 in connection with related U.S. Appl. No. 12/688,400.

Office Action issued by the U.S. Patent Office on Feb. 15, 2012 in connection with related U.S. Appl. No. 12/820,227.

Office Action issued by the U.S. Patent Office on Feb. 15, 2012 in connection with related U.S. Appl. No. 12/230,338.

Office Action issued by the U.S. Patent Office on Mar. 5, 2012 in connection with related U.S. Appl. No. 12/968,682.

U.S. Appl. No. 10/843,374, filed May 2004, Roesch et al., System and methods for determining characteristics of a network based on flow analysis.

U.S. Appl. No. 12/813,859, filed Jun. 2010, Polley et al., System and method for assigning network blocks to sensors.

U.S. Appl. No. 12/820,227, filed Jun. 2010, Vogel III et al., System and method for resolving operating system or service identity conflicts.

U.S. Appl. No. 12/969,682, filed Dec. 2010, Roesch et al., Systems and methods for determining characteristics of a network and enforcing policy.

U.S. Appl. No. 13/086,819, filed Apr. 2011, Olney et al., System and method for near-real time network attack detection, and system and method for unified detection via detection routing.

Aho et al., "Efficient String Matching: An Aid to Bibliographic Search," *Communications from the ACM* (Jun. 1975), vol. 18, No. 6, pp. 333-340.

Tarjan, et al., "Storing a Sparse Table," Communications of the ACM (Nov. 1979), vol. 2, No. 11, pp. 606-620.

V. Jacobson, et al., Request for Comments: 1323, "TCP Extensions for High Performance," May 1992 (35 pages).

J. Howe, "An Environment for "Sniffing" DCE-RPC Traffic," *CITI Technical Report 93-4*, Jun. 21, 1993, 12 pages total.

T. Ptacek, et al., "Insertion, Evasion, and Denial of Service: Eluding Network Intrusion Detection", Jan. 1998, pp. 1-63.

R. Gula, "Passive Vulnerability Detection. *Techniques to passively find network security vulnerabilities*," Sep. 9, 1999 (5 pp.).

N. Chase, "Active Server Pages 3.0 from Scratch" (Dec. 1999), Searching for products section, 13 pp.

L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.

N. Brownlee, et al., "Methodology for Passive Analysis of a University Internet Link," *PAM2001 Passive and Active Measurement Workshop*, Apr. 2001 (7 pp.).

B. Krishnamurthy, "Web Protocols and Practice," (May 1, 2001), pp. 518-520.

G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.

U. Shankar and V. Paxson, *Active Mapping: Resisting NIDS Evasion Without Altering Traffic*, Proc. IEEE Symposium on Security and Privacy. May 2003, pp. 1-18.

D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.

R.P. Lippmann et al., "Passive Operating System Identification from TCP/IP Packet Headers," *Proceedings Workshop on Data Mining for Computer Security (DMSEC)*, Nov. 2003 (10 pp.).

Norton et al., "Multi-Patten Search Engine Aho-Corasick State Machine" (Mar. 17, 2004), Version 2.0, 36 pp.

R. Hiyoshi, "Pràctical Guide to Intrusion Detection System: Snort & Tripwire," Japan, Apr. 25, 2004, pp. 57-230 (concise English explanation of relevance attached).

R. Deraison, et al., "Passive Vulnerability Scanning: Introduction to NeVO," *Tenable Network Security*, May 30, 2004, pp. 1-13.

Full Band and Matrix Algorithms (Jun. 9, 2004), http://web.archive.org/web20040109154658/http://www.netlib.org/utk/lsi/pcwLSI/text/node150.html.

M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

R. Deraison, et al., "Nessus Network Auditing," *Sungress Publishing*, Jul. 20, 2004, pp. 1-13.

Norton et al., "Sourcefire Optimizing Pattern Matching for Intrusion Detection" (Sep. 2004), 14 pp.

J. Novak, "Target-Based Fragmentation Reassembly" (Apr. 2005), Revision 2.0, pp. 1-32.

S.Siddharth, "Evading NIDS, revisited" (Dec. 12, 2005).

"Snort™ Users Manual 2.6.0," *The Snort Project* (May 23, 2006), pp. 1-126.

(56) References Cited

OTHER PUBLICATIONS

"toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
D. Joseph, et al., "A Policy-aware Switching Layer for Data Centers," *SIGCOMM*, Aug. 17-22, 2008, pp. 51-62.
"Enhanced Operating System Identification with Nessus," *Tenable Network Security* (2007), obtained from: http://blog.tenablesecurity.com/2009/02/enhanced_operat.html, posted by R. Gula on Feb. 16, 2009 (3 pp. total).
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2—2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with parent U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with parent U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with parent U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.

(56) References Cited

OTHER PUBLICATIONS

Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with parent U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with parent U.S. Appl. No. 10/843,459.
European Search Report issued by the European Patent Office on Oct. 12, 2009 in connection with European patent application No. 05773501.1-2201, which corresponds to related U.S. Appl. No. 10/898,220, U.S. Appl. No. 11/785,609 and U.S. Appl. No. 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. No. 10/898,220, 11/785,609 and 12/010,900.
Notice of Allowance issued by the U.S. Patent Office on Feb. 5, 2010 in connection with related U.S. Appl. No. 11/272,034.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
International Search Report and Written Opinion of the International Searching Authority issued on Mar. 16, 2010 in connection with PCT application No. PCT/US09/59965, which corresponds to U.S. Appl. No. 12/575,612.
Office Action issued by the U.S. Patent Office on Mar. 16, 2010 in connection with related U.S. Appl. No. 11/272,035.
Final Office Action issued by the U.S. Patent Office on Mar. 17, 2010 in connection with related U.S. Appl. No. 10/843,374.
Office Action issued by the U.S. Patent Office on Mar. 22, 2010 in connection with related U.S. Appl. No. 11/493,934.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.

Office Action issued by the U.S. Patent Office on Apr. 21, 2010 in connection with parent U.S. Appl. No. 10/843,459.
Notice of Allowance issued by the U.S. Patent Office on May 24, 2010 in connection with related U.S. Appl. No. 10/843,398.
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with parent U.S. Appl. No. 10/843,459.
Final Office Action issued by the U.S. Patent Office on Sep. 17, 2010 in connection with related U.S. Appl. No. 11/711,876.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with parent U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,908.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=applications/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/trl507/trl507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection

(56) References Cited

OTHER PUBLICATIONS with PCT patent application No. PCT/US2009/059965, which corresponds to U.S. Appl. No. 12/575,612.
Office Action issued by the U.S. Patent Office on Mar. 19, 2012 in connection with related U.S. Appl. No. 12/813,859.
International Search Report and Written Opinion of the International Searching Authority issued on Apr. 25, 2012 in connection with corresponding PCT application No. PCT/US2012/021633.
Final Office Action issued by the U.S. Patent Office on May 29, 2012 in connection with related U.S. Appl. No. 12/230,338.
Notice of Allowance issued by the U.S. Patent Office on May 30, 2012 in connection with related U.S. Appl. No. 12/575,612.
Final Office Action issued by the U.S. Patent Office on Jun. 5, 2012 in connection with related U.S. Appl. No. 12/813,859.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Notice of Allowance issued by the U.S. Patent Office on Jul. 22, 2011 in connection with related U.S. Appl. No. 11/711,876.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to U.S. Appl. No. 13/086,819.
Matthew Olney et al.: "What would you do with a pointer and a size? A New Detection Framework", Apr. 22, 2010 (Apr. 2, 2010), XP55002567, http://labs.snort.org/nrt/sfvrt-nrt.pdf (retrieved on Jul. 12, 2011) the whole document.
Notice of Allowance issued by the U.S. Patent Office on Jun. 25, 2012 in connection with related U.S. Appl. No. 12/688,400.
International Search Report and Written Opinion of the International Searching Authority issued on Sep. 1, 2011 in connection with PCT application No. PCT/US2011/035874, which corresponds to U.S. Appl. No. 12/820,227.
Francois Gagnon et al.: "A Hybrid Approach to Operating System Discovery using Answer Set Programming", Integrated Network Management, 2007. IM'07, 10$^{th}$ IFIP/IEEE International Symposium On, IEEE, PI, May 1, 2007, pp. 391-400, XP031182713, ISBN: 978-1-4244-0798-9, p. 293, 394-397.
Final Office Action issued by the U.S. Patent Office on Sep. 14, 2011 in connection with related U.S. Appl. No. 12/230,338.
Office Action issued by the U.S. Patent Office on Oct. 21, 2011 in connection with related U.S. Appl. No. 12/969,682.
Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.
Notice of Allowance issued the by U.S. Patent Office on Oct. 28, 2011 in connection with related U.S. Appl. No. 12/149,196.
Advisory Action issued by the U.S. Patent Office on Nov. 28, 2011 in connection with related U.S. Appl. No. 12/230,338.
Office Action issued by the U.S. Patent Office on Oct. 15, 2012 in connection with related U.S. Appl. No. 12/230,338.
International Preliminary Report on Patentability mailed by the International Bureau of WIPO on Oct. 26, 2012, in connection with corresponding PCT application No. PCT/US2011/032489, which corresponds to related U.S. Appl. No. 13/086,819.
Office Action issued by the U.S. Patent Office on Nov. 6, 2012 in connection with related U.S. Appl. No. 12/820,227.
Li, Zhichun, et al. Netshield: Matching with a large vulnerability signature ruleset for high performance network defense. Technical Report NWU-EECS-08-07, Northwestern University, Aug. 2010.
Notice of Allowance issued by the U.S. Patent Office on Jan. 9, 2013 in connection with related U.S. Appl. No. 12/813,859.
Office Action issued by the U.S. Patent Office on Jan. 10, 2013 in connection with related U.S. Appl. No. 12/969,682.
U.S. Appl. No. 13/779,851, filed Feb. 28, 2013, Polley et al.
International Preliminary Report on Patentability mailed by the International Bureau of WIPO on Jan. 10, 2013, in connection with corresponding PCT international application No. PCT/US2011/035874, which corresponds to related U.S. Appl. No. 12/820,227.
Notice of Allowance issued by the U.S. Patent Office on Mar. 14, 2013 in connection with related U.S. Appl. No. 12/230,338.
Auffret, Patrice. "SinFP, unification of active and passive operating system fingerprinting." Journal in Computer Virology 6.3 (2010): 197-205.
De Montigny-Leboef, Annie. "A multi-packet signature approach to passive operating system detection." Defense Technical Information Center, 2005.
Tu, William, et al. "Automated Service Discovery for Enterprise Network Management." Mar. 8, 2009.
Taleck, Greg. "Ambiguity Resolution via Passive OS Fingerprinting." Recent Advances in Intrusion Detection. Springer-Verlag Berlin Heidelberg, 2003.
Martin Roesch, "Snort-Lightweight Intrusion Detection for Networks", Proceedings of LISA '99: 13$^{th}$ System Administration Conference, Nov. 12, 1999, pp. 229-238, http://citeseerx.ist.psu.edu/viewdoc/summary?doi=10.1.1.105.6212.
Office Action issued by the European Patent Office on Mar. 20, 2013 in connection with European Patent Application No. 05773501.1—1952 which corresponds to related U.S. Appl. No. 10/898,220 (now patent No. 7,539,631).
Notice of Allowance issued by the Canadian Intellectual Property Office on Apr. 19, 2013 in connection with Canada Patent Application No. 2685292, which corresponds to related U.S. Appl. No. 12/820,227.
Final Office Action issued by the U.S. Patent Office on Apr. 18, 2013 in connection with related U.S. Appl. No. 12/969,682.
Office Action issued by the U.S. Patent Office on May 6, 2013 in connection with related U.S. Appl. No. 12/820,227.
Office Action issued by the U.S. Patent Office on May 8, 2013 in connection with related U.S. Appl. No. 13/086,819.

* cited by examiner

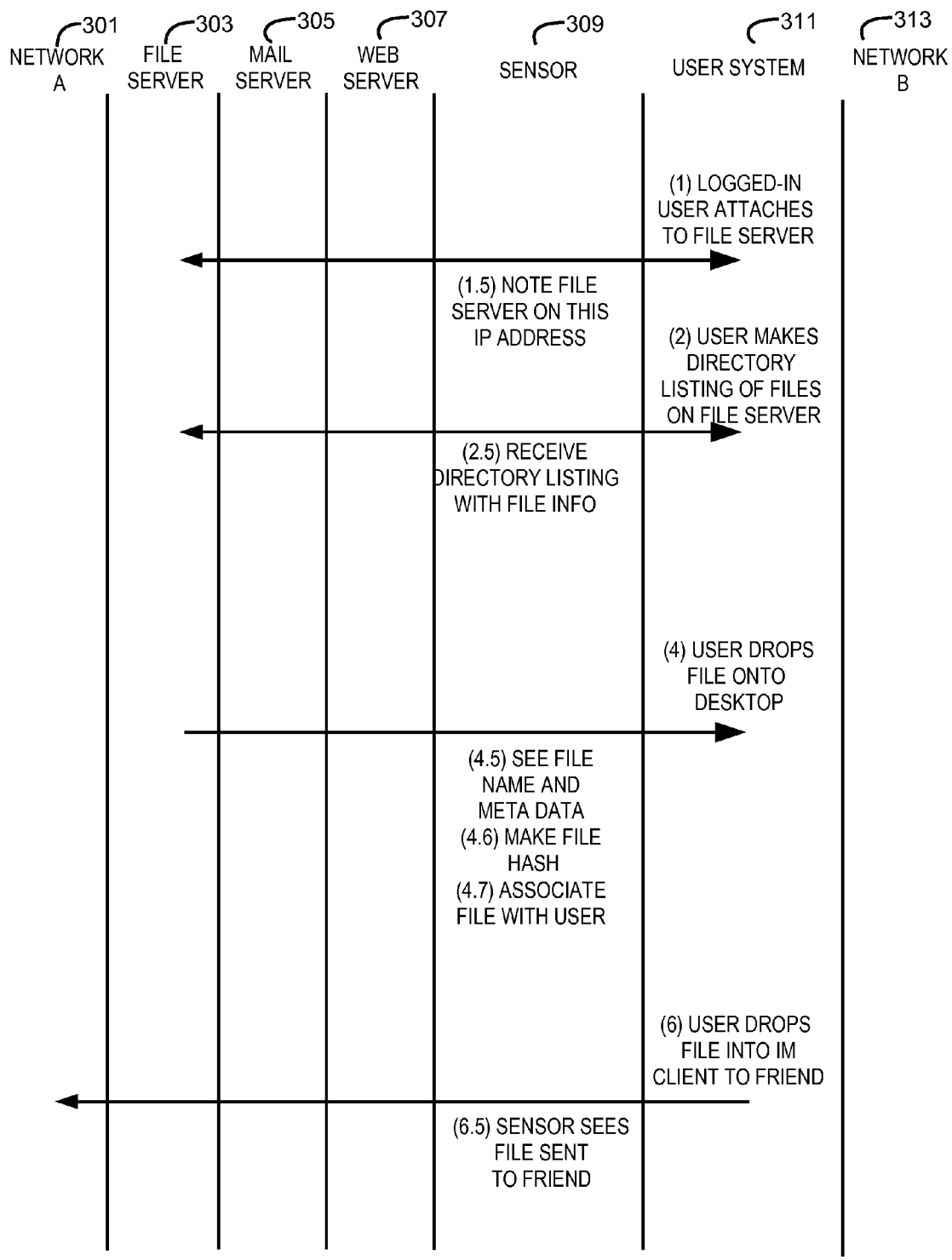

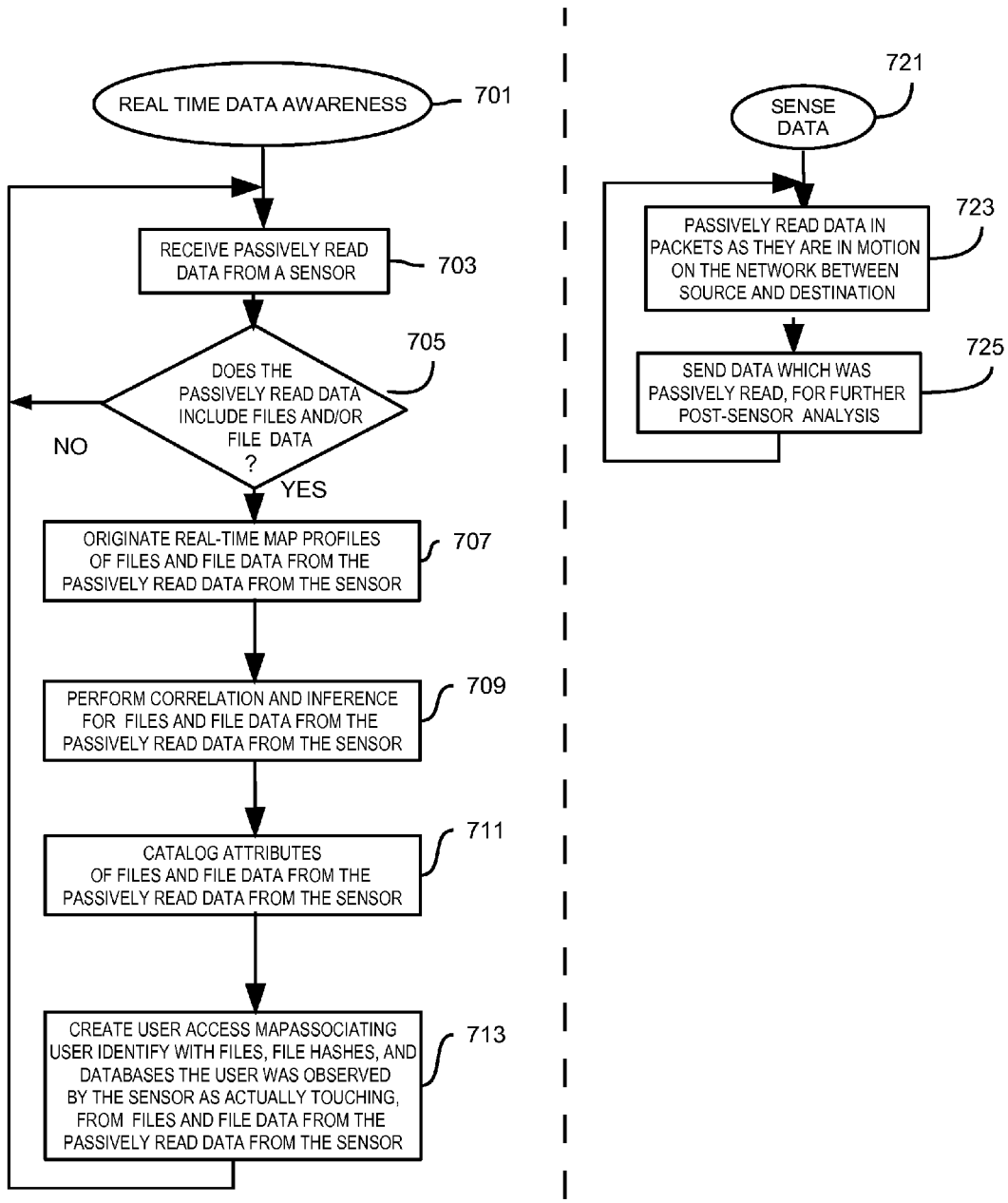

SYSTEM AND METHOD FOR REAL TIME DATA AWARENESS

TECHNICAL FIELD

The technical field relates in general to communication network security, and more specifically to passively determining attributes of data (such as location of data) in a network, from packets in motion on the network.

BACKGROUND

A "data leak prevention" (DLP) system is a technology designed to keep a company's data in that company's network, or at least so the company can manage it and influence its motion on the company's network. A DLP assumes that it knows where the data is which it is monitoring. Classic examples of problems the DLP is trying to solve are people e-mailing to places where they shouldn't or with attachments that they shouldn't, people trying to e-mail out the company's source code, people trying to download the company's credit card database, and the like.

Initially DLP was positioned as something designed to stop malicious users from exfiltrating data out of the network. In practice, it turned into something to keep people from doing stupid things with data. It turned into a stupidity prevention system. Basically, a DLP was good for things like preventing fat-fingering auto-complete e-mail addresses, for example, when the company's provisional quarterly numbers are accidentally sent to the Washington Post instead of the company's accountant.

SUMMARY

Accordingly, one or more embodiments of the present invention provide methods, systems, and/or computer readable memory mediums, in which a sensor is configured to passively read data in packets as the packets are in motion on a network; and a processor is cooperatively operable with the sensor, and configured to receive the read data from the sensor; and originate real-time map profiles of files and file data, both from the read data from the sensor, as the passively read packets are in motion on the network.

In an embodiment, the processor can be configured to perform correlation and inference from the read data read by the sensor.

In another embodiment, the processor can be configured to catalog attributes of the files and the file data, all from the read data in the packets in motion on the network.

In still another embodiment, the attributes which are cataloged include: file name, file size, time stamp, file hash, block hashes, server ID that contained the file, host ID which contains the file, user ID who sent it, user ID who is receiving it, place file is transferred to, content of the file, where the file data is, who has access to the file data or the file, what device has the file data on it, how the file was transferred, how the file was transformed.

In another embodiment, the content of the file which is cataloged comprises: keywords, hashes, and file content changes.

In yet another embodiment, the content of the file can be determined by analyzing the file and the file data as it is flowing by for keywords or hashes in the files in the data.

In a further embodiment, the processor can be configured to create a user access map associating user identity with the files, file hashes, and databases the user has actually touched.

In another embodiment, wherein the sensor can be configured to embed a honeytoken into voids inside the file contained in the passively read packets when the file has a file format predetermined to have dead data that can be overwritten, and to use the honeytoken to aid tracking of the file's movement around and outside the network.

In a still further embodiment, the honeytoken that is embedded in the file can be one of a main hash of the entire file, and a block hash of an individual block within the file. In still another embodiment, a honeytoken of both kinds (main hash of the entire file, and block hash of individual block within the file) can be provided and embedded in the file.

In another embodiment, the processor further examines the read data from the sensor for the files and the file data, when the read data is, for example, one or more of a conversation between users, a page being downloaded, an e-mail attachment, a file download, a file repository access, and a file transfer via the network. Optionally, the processor skips examining the read data from the sensor for the files and file data when the read data is not one of the foregoing.

In still another embodiment, the file repository access can be a download, an ftp transfer, a file share access, or an NFS access. Optionally, the file repository access can be extensions and variations of the foregoing.

A further embodiment provides that the processor is further configured to extract metadata from the read data in the passively read packets to generate passively discovered metadata, as the packets are in motion on the network, the read data including: the main hash of the entire file, the block hash of individual blocks within the file, the directory listing of files with file names, dates, time stamps, size, and file owners; the hash being a cryptographic hash unique to the file; store the passively discovered metadata, attributes of the files, and the file data, in a relational database; and store the passively discovered metadata in a data map of passively discovered metadata.

Another embodiment provides that the relational database is based around the file itself and indicates where the file has been transferred and who transferred it.

A still further embodiment provides that the relational database can be implemented as a postprocessor to the sensor.

In still another embodiment, the processor is further configured to infer a user role from who is using the file and the file data and how the user is transferring or accessing the file and the file data; and detect when the user is performing an inappropriate usage from the inferred user role and the read data from the sensor.

In another embodiment, the processor is further configured to report on how a content of the file has changed, the changes including location reflected in the file data, ownership reflected in the file data, changes in the file data itself, and changes in the file itself.

Yet another embodiment provides a method for any or all of the foregoing, and/or a combination of the foregoing.

A still further embodiment provides a computer-readable storage medium comprising computer-executable instructions for performing any or all of the foregoing, and/or a combination of the foregoing.

In a still further embodiment, there is a system, a method, and/or a computer readable medium that provides for (A) a sensor and (B) a processor.

(A) The sensor is configured to:
 (1) passively read data in packets as the packets are in motion on a network;
 (2) embed a honeytoken into voids inside files contained in the passively read packets when the file has a file format predetermined to have dead data that can be overwritten, and to use the honeytoken to aid tracking of the file's movement around and outside the network, the honeytoken can be a main hash of the entire file and/or a block hash of one or more individual blocks within the file.

(B) The processor is configured to:
(1) receive the read data from the sensor;
(2) identify files and file data in the data read in the passively read packets as the passively read packets are in motion on the network, the files and the file data including conversations between users, pages being downloaded, e-mail attachments, file downloads, file repository accesses (e.g., downloads, ftp, file share, NFS), and file transfers via the network;
(3) generate real-time map profiles of the files, systems, users and the file data observed as the files and file data in the data read in the passively read packets;
(4) catalog attributes of the files and the file data, including direct file data information (e.g., file name, file size, time stamp, file hash, block hashes, server ID that contained the file; host ID which contains the file, user ID who sent it, user ID who is receiving it, place file is transferred to, content of the file (e.g., keywords or hashes, file content changes), where the data is, who has access to the data or file, what device has data on it, how the file was transferred, how the file was transformed (e.g., encrypted)), all observed from the data in the packets in motion on the network;
  (i) the content of the file being determined by analyzing the data as it is flowing by for key words or hashes;
(5) extract metadata from the data in the passively read packets to generate passively discovered metadata, as the packets are in motion on the network, including: the main hash of the entire file, the block hash of individual blocks within the file (e.g., paragraph hash of WORD files, data block hash of ACROBAT or OFFICE files), the directory listing of files with file names, dates, time stamps, size, and file owners; the hash being a cryptographic hash unique to the file; and store the metadata and direct information in a relational database;
(6) create, from the observed files and the file data, a user access map associating user identity with files, file hashes, and databases the user has actually touched;
(7) infer, from the observed files and the file data, a user role from who is using the data and how they are transferring or accessing it, and detecting when a user is performing an inappropriate usage from the inferred user role and the data read in the packet as it is in motion on the network; and/or
(8) report, from the observed files and the file data, on how a content of the file has changed, the changes including location of data, ownership of data, changes in the data itself.

(C) The relational database that stores the passively discovered metadata is based around the file itself and thereby indicates an observation from passively read packets as to where the file has been transferred and who transferred it, the relational database being implemented as a postprocessor to the sensor.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 3 is a sequence diagram illustrating some examples of real time data awareness processing;

FIG. 7 is a flow chart illustrating a process for real time data awareness; and

DETAILED DESCRIPTION

Figure 1:
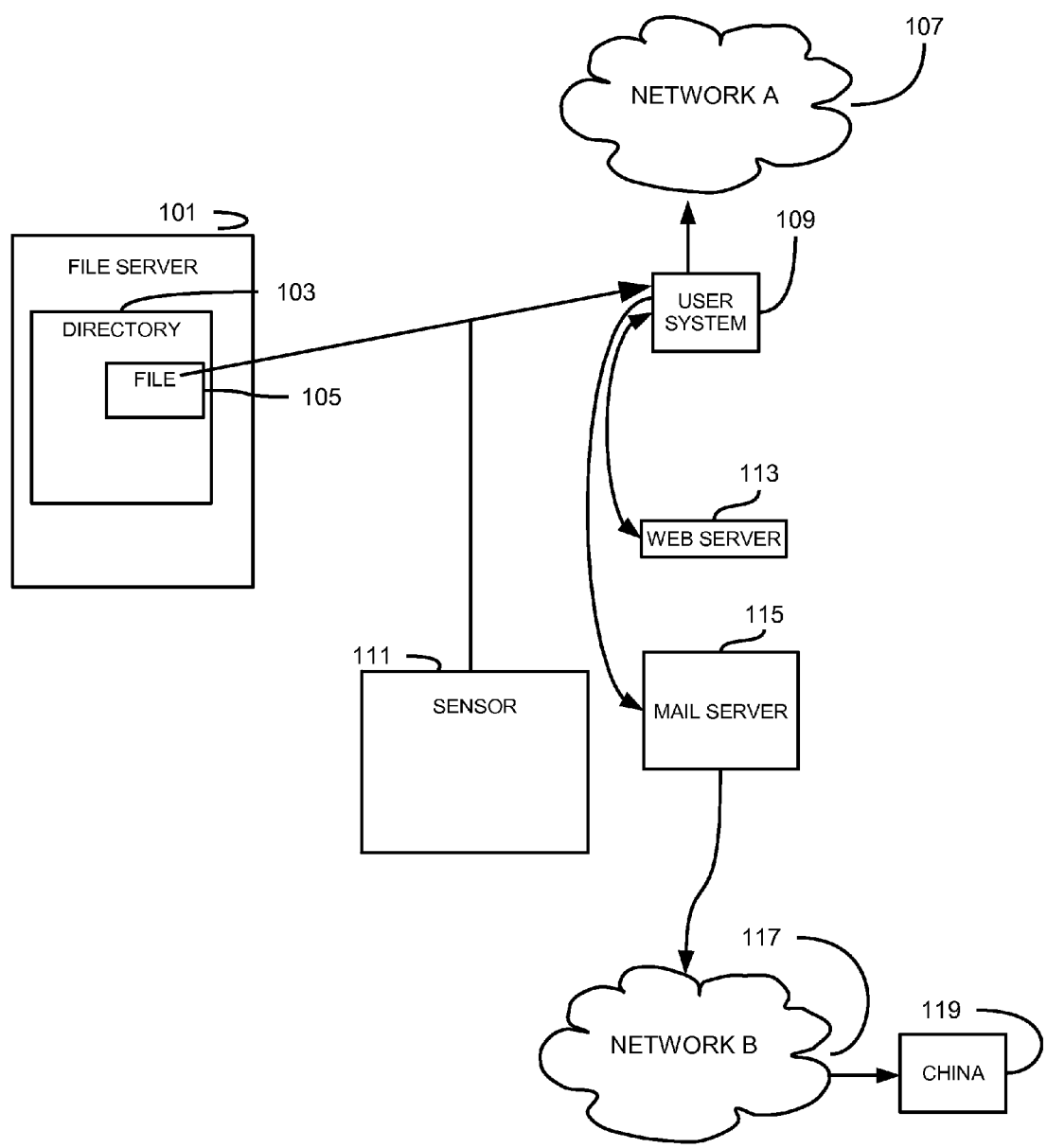
FIG. 1 is a diagram illustrating a simplified and representative environment associated with real time data awareness.

In overview, the present disclosure concerns security of communication networks, often referred to as packet switching networks, which support communication between a source and a destination. Packets on such communication networks may carry information which reveals data (for example, files) stored on the network. More particularly, various inventive concepts and principles are embodied in systems, devices, and methods therein for analyzing packets on a communication network to passively determine attributes of data (such as location) in the computer network, so as to provide real time data awareness.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Real time data awareness (RDA) came from looking at data leak prevention (DLP) systems and finding them wanting. Most DLP systems expect the company to know where all of the company's data is. Most security technology expects the user to know what the network looks like, what devices are plugged in, and how they are configured.

Conventional DLP technology expects the company to know where all of its data is. We can show that people have no idea where their data is. The data is not in static locations on the network—it is usually in motion. For example, the data might be on the laptop that walks out the door every day. The way data is typically shared between co-workers is not through a file server, but rather through e-mail; occasionally a file share is used to share data. In practice, a data transfer is not typically done via a file server.

It was realized that, if a system had a way to passively analyze the network traffic and look at the data in motion on the network, the system could start cataloging the attributes of the data as it revealed itself without having to previously know anything about the data.

Verizon's "Data Breach Investigations Report" is an excellent source of empirical data about computer incidents which were handled for customers: how they hacked in, what tools they used, how hard it was, what they got out, and how they were detected. Eighty percent of the time, people do not know what is being hacked: the systems involved, the users and what they have access to, or the data which is hacked. The data problem is the biggest problem of them all. People have no idea where their data is on the network or devices.

Figure 8:
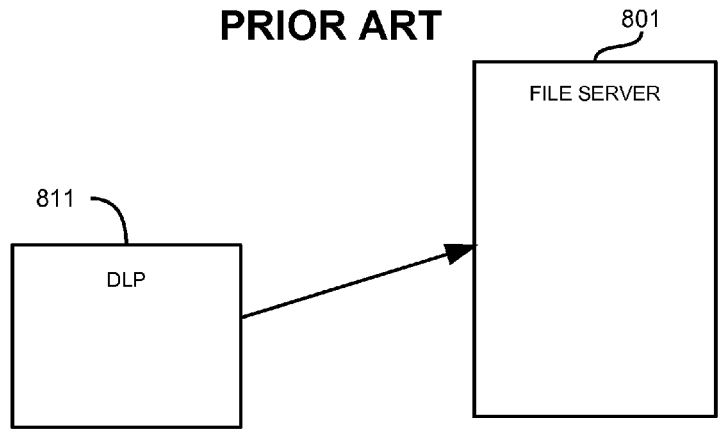
FIG. 8 is a diagram illustrating a prior art data leak prevention system.

In a conventional DLP, the user tells it where the data is, and the DLP does a "registry" process where it hashes the documents where it has been told to build up a map of the data which it knows about. Then it watches for that known data to go past the devices which are sniffing. The foundational assumption for a DLP is that a user has identified where the data is, so that the DLP can crawl the data. In a conventional DLP, represented by FIG. 8, a DLP 811 is told where the data is. In this example, the DLP is told that the data is on a file server 801. The DLP 811 crawls the file server 801 to do data registration, e.g., by inserting file hashes into files on the file server 801. Then, the DLP can monitor and observe, for example, for hashes in e-mails. The DLP will solve the problem of securing data only so long as somebody keeps telling the DLP where the data is, so that the DLP is aware of the data before it is observed in a packet. If a user has not identified a location with data, the DLP will be unaware of that data moving around.

These and other problems in network data security can be addressed by various embodiments of real time data awareness discussed herein.

Further in accordance with exemplary embodiments, real time data awareness can passively analyze network traffic and look for data. In contrast to a conventional DLP, the RDA system or method assumes that the user may have no idea where the data is, and the data will reveal itself as it moves without the system being aware of the data in advance of the data being in motion.

Such a system or method can observe conversations between users, pages being downloaded, e-mail attachments, downloads, and the like; and can associate attributes with the data such as file name, file size, who sent it, who is receiving it (provided from a login, source/destination IP address, actual user (as disclosed in Ser. No. 12/149,196, "Real Time User Awareness for a Computer Network", hereby expressly incorporated by reference) or similar), content of the file (by analyzing the data stream as it is flowing by for key words or hashes and looking for snippets of files showing up in other files), even reporting on how a file's content changes. Such a system or method can see all of these things by analyzing network traffic when it is in motion, on the wire, as the data reveals itself without being actively assessed before being in motion.

The approach can include analyzing the network environment, building a catalog of where the company's data is and who has access to it, and/or looking for change in real time. Changes can include, for example, location of data, ownership of data, and changes in data itself Once the system has the information provided by RDA (discussed herein), it can build a data leak prevention system because it has an idea of where the data actually is.

The catalogued data can include a user access map, which associates user identity with data (files and databases) that they have actually touched.

This information can be gathered from user actions such as e-mail, database access, file repository accesses (ftp, file share, NFS and the like), file transfers via the web, etc. Various embodiments propose one or more of the following:

- a catalog of where my data is (what devices have data on them that I am interested in)
- to know the metadata (data about the data)
- to know who has had access to the files
- to know who is moving the files
- to be able to extract metadata
- to identify changes to a file, e.g., essentially hashing the file to generate a cryptographic hash which is unique to that file, and then one can look for the hash for that file in other places.

In one analogy, DLP is like active sonar where pings are sent out; in contrast, this system is like passive sonar in which the targets in the environment tell the system about themselves by the noise they make. Conventional systems in this area are all like active sonar, sending out pings. They do not work very well.

In another analogy, consider that an astronomer's job is almost entirely passive—the astronomer waits to make observations, and gradually builds up a picture of the universe based on data which is merely observed. The astronomer then infers things about the remote entities based on the data.

As with the above analogies, the present system can wait for the direct action of a remote, possibly unknown entity in the network to reveal itself at the detector (e.g., sensor), and from the passively revealed information the system can generate and build up a picture about what was revealed. Then the system can start inferring things about the files based on the data, e.g., file server, directories thereon, files in the directory, percent of files which are archived because nobody touches them anymore, the active data set of the enterprise.

Moreover, in IPV6, active scanning (as with conventional DLP systems) will not work as a practical matter. The smallest network in IPV6 will have a 32 bit address space. It can take days to scan a 32 bit address space because it is so massive. In IPV6, the address space is several billion times larger than IPV4. There is a fundamental issue throughout networking of figuring out what the system has and how it is configured. Typically before IPV6, figuring out what the system has and how it is configured is done by people specifying how things are set up, or by scanning, or by observing passively. Basically, after IPV6 is common, there is no practical way to scan the entire system. After IPV6 is common, it is not unreasonable for each individual in a company to have about 24 million IP addresses. $2^{128}$ addresses is a staggeringly large number.

The passive approach detailed herein came about from the realization that focuses on real-time response and capabilities. One thing that active methods do not provide is real time response—the ability for a system to see what is going on right now in order to change itself.

The idea herein is to passively analyze the network traffic and use the passively revealed information to generate an initial profile and keep it current by observing what actually happens. Passive monitors such as protocol analyzers, sniffers, etc. do not take the next step of generating profiles. This system can generate real-time profiles of systems, users, and data.

The data being monitored includes the files themselves, or database transactions. Consider, for example, that a user has an SMTP session to transfer a file, which results (as is well understood) in packets containing the SMTP command protocol, the e-mail itself, and the file attachment. The system is interested in the file attachment: (A) it was transferred, (B) the file contents, (C) who sent it and to whom it was sent.

As another example, consider a user attaching to a file server, which generates a directory listing. The system can catalog the directory listing of files which exist on the file server.

In comparison to an intrusion detection/prevention system (IDS/IPS), the IDS/IPS has no clue about files but can see protocols, ports, and clients. The IDS/IPS is primarily interested in the configuration of devices on the network, from which can be inferred vulnerabilities of the devices. In comparison to SNORT™ packet sniffing software, SNORT™ is purely an in-line device that looks at traffic and looks for attacks.

A difference over the conventional DLP is that the system described herein is figuring out where the data is, as the data reveals itself when in motion. The system observes the traffic as it is in motion on the network, instead of trying to go out and find it actively.

Referring now to FIG. 1, a diagram illustrating a simplified and representative environment associated with real time data awareness will be discussed and described. FIG. 1 illustrates a file server 101 storing a file 105 therein, and having a directory 103 listing the file 105 and many other files thereon, in accordance with known methods. Also illustrated is a user system 109, a sensor 111, a web server 113, a mail server 115, a network A 107, a network B 117, and a recipient in China 119. The sensor is deployed in conventional fashion to monitor packets which are in motion on the network, such as between the file server 101 and the user system 109, web server 113, and mail server 115.

Packets are sent between source and destination, for example, when the file 105 is retrieved by the user system 109 which results in packets being sent between the file server 101 and the user system 109. As another example, packets may be sent between source and destination, e.g., the user system 109, the network A 107, the web server 113, the mail server 115, and network B 117. The sensor 111 is disposed in accordance with known techniques so as to observe packets in motion between source and destination. In this illustration, the sensor 111 is disposed between the file server 101 and the user system 109. The sensor 111 is representative of sensors which can be disposed between the user system 109 and the web server 113, the user system 109 and the mail server 115, between the mail server 115 and the network B 117, and/or between the user system 109 and the network A 107.

In the illustration, the user system 109 initiates transmissions and requests to the file server 101, the network A 107, the web server 113, the mail server 115, and the network B 117. The packets which are transmitted can be monitored in accordance with well known techniques by a network appliance such as with the sensor 111. Alternatively, the sensor 111 can be provided in-line, or can be incorporated into one or more of the file server 101, the user system 109, the web server 113, or the mail server 115.

Monitoring data in the packets to see a file is quite different from monitoring for an intrusion using an IDS/IPS. There are two big problems addressed by RDA that an IDS/IPS does not have: (1) RDA typically goes deeper into the traffic streams in order to get the information. In contrast, most of the data in the packets that an IDS/IPS operates on is within the first couple hundred bytes of the application layer. (2) RDA can go through the application layer portion of the packet to get to the actual file itself. Hence, RDA can be a more intensive process. RDA may know more protocols (e.g., file transfer protocols) explicitly and be able to follow them all the way down through the layers in the packet, and then reconstitute the data which could be in any number of formats, e.g.: MIME (multipurpose internet Mail extensions)-encoded, zipped, and/or encrypted. The file data might be in different places in the packets for different protocols. For example, the file data is generally at the lowest level of the protocol, but in an e-mail it is usually MIME-encoded as part of the body of the e-mail. The system might need to know that there is a MIME attachment, base 64 encoded, which must be unwound in to a zip file, which must then unzip, hash, etc. And then, the system can start doing the file analysis.

Actually being able to, on the fly, identify the contents of the file as it is in motion on the network, and then catalog it, as further discussed herein, is very new. Before this, the bytes were captured and then later attempted to be unwound.

Figure 2:
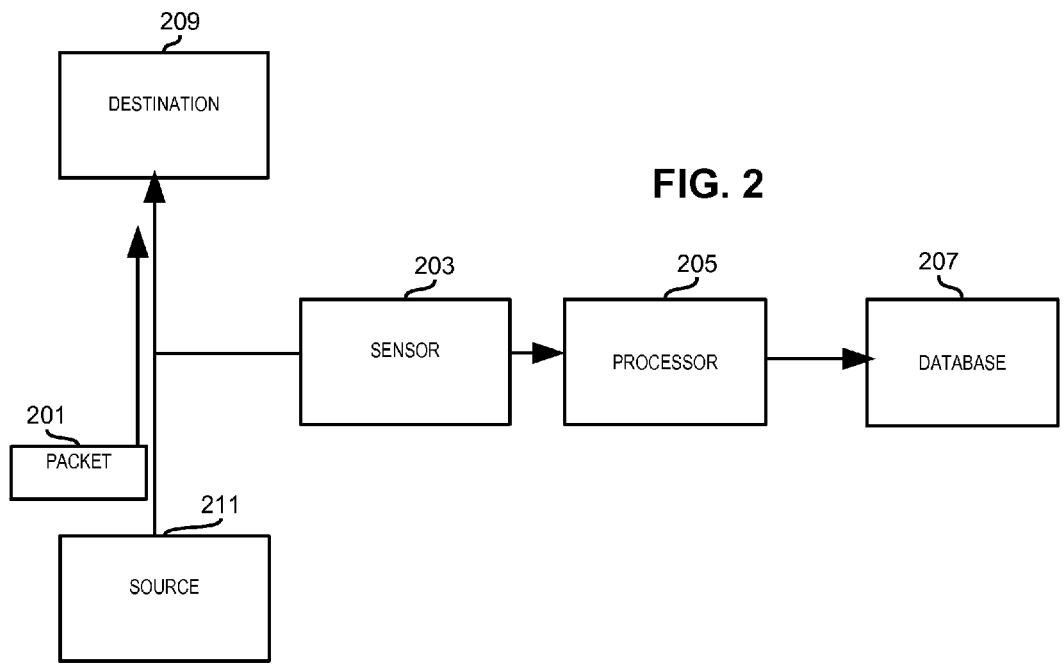
FIG. 2 is a block diagram illustrating a system used for real time data awareness.

Referring now to FIG. 2, a block diagram illustrating a system used for real time data awareness will be discussed and described. FIG. 2 illustrates a packet 201, a source 211, a destination 209, a sensor 203, a processor 205, and a database 207. The packet 201 is transmitted from the source 211 to the destination 209. The packet 201 is representative of numerous packets which can be transmitted between source 211 and destination 209, as will be well understood in the art. The designation "end points" (plural) or "end point" (singular) is used herein specifically to indicate generically the source and/or destination identified in the packet header.

In order to perform RDA, the sensor 203 may know about a lot of protocols. Advantageously, a correlation backend, such as the illustrated processor 205 and database 207 can be provided. For example, one or more sensors (represented by sensor 203) can talk to a single processor 205, and the single processor 205 can do correlations and make decisions about what to do and inform the rest of the system.

In order to get to the data, a deep packet inspection can be performed to unpack the packets, and then figure out the file format itself so as to be able to work with the file.

A supporting database 207, such as a relational database, can be provided. The metadata which is collected can be stored into the database 207 which supports the system.

In an embodiment, the supporting database 207 can be based around the file itself, where it has been transferred, and who has transferred it being used as keys or indexes. The information stored in the database 207 can include, for example:

File name, time stamp, size, file hash, subhash. (information about the file itself read directly from the packet traffic)

Server ID that contained the file (IP address), host ID (which contains the file), user ID, places file transferred to (information about the packet containing the file, read directly from the packet traffic)

Files themselves, the places the files have been, the people that had the files, the processes used to transfer/transform (e.g., encrypt) the file (information inferred about the file)

Inferred information can include, for example, the user role, inferred from types of data the user transfers/accesses.

Inferred information can be based on transformations the user performs on the file—should the file be encrypted before transferred? The system can infer malicious behavior from, e.g., an activity that fakes out a DLP such as breaking a single file into smaller pieces.

As illustrated, the sensor 203 can be on the front end of a back-end which comprises a processor 205 containing a correlation and inference engine, and the database 207. The sensor 203 can spool the packets onto a disk to avoid real-time analysis, if desired.

Building and managing the maps of the files is difficult. A real-time map of a large network is difficult to manage. Most of the data can be kept in memory of the processor 205, in order to be timely.

Figure 4:
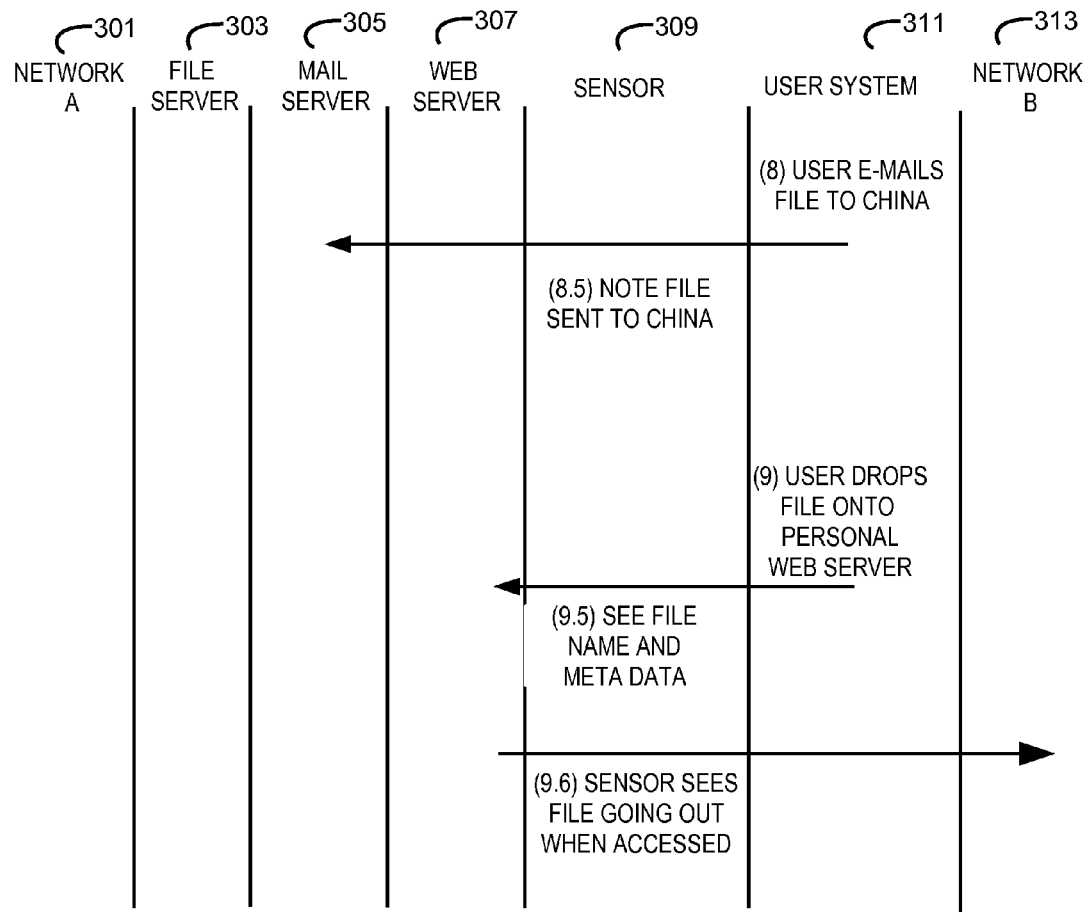
FIG. 4 is a continuation of the sequence diagram of FIG. 3.

Referring now to FIG. 3 and FIG. 4, a sequence diagram illustrating some examples of real time data awareness processing will be discussed and described. FIG. 4 is a continuation of FIG. 3. The sequence diagrams of FIG. 3 and FIG. 4 could be envisioned for use of the example system illustrated in FIG. 1.

The following are a few representative example scenarios of data in motion. In the illustration, scenario 1 encompasses stages 1, 1.5, 2 and 2.5; scenario 2 encompasses stages 4, 4.5, 4.6, and 4.7; scenario 3 encompasses stages 6 and 6.5; scenario 4 encompasses stages 8 and 8.5; and scenario 5 encompasses stages 9, 9.5 and 9.6. FIG. 3 and FIG. 4 are simplified, and represent other combinations and sequences of the scenarios as will be appreciated by one of skill in the art.

Scenario 1

At stage 1, a logged-in user attaches to a file server 303. The attachment to the file server is performed in accordance with known techniques which include sending a series of packets (summarized by the illustrated arrow, which shows end points) to and from the user system 311 and the file server 303. A sensor 309 passively receives packets transmitted on the network, according to known techniques. The sensor can be located between the end points. From the data in the packets which effectuate the attaching to the file server, at stage 1.5, a sensor 309 sees that there is a file server on this IP address.

At stage 2, the user system 311 and the file server 303 exchange packets, according to conventional techniques, so that the user system 311 gets a directory listing of what is on a file server 303. Meanwhile, at stage 2.5 the sensor 309 receives the directory listing that lists files with directory listing information. Conventional directory listing information can include names, dates, time stamps (for creation, access and/or modification), file sizes, and perhaps file ownership and/or other information. The directory listing information gives the sensor 309 a picture of the file server 303, specifically, some of the files and structure of files which are on the file server 303.

The sensor 309 (or its backend processor, as further described herein) can originate a map profile of the files and file data listed in the directory listing, merely by passively observing the packet. It is not necessary for the system to have prior information about the files on the file server 303. It is expected that the directory listing is not a complete list of files on the file server 303. Subsequent directory listings from the file server 303 received by the user system 311 can be used to expand the map profile to include additional files in the subsequent directory listings. The term "originate" is used herein to indicate that the sensor 309 (or its backend) is not previously aware of the existence of the file; hence, an entry indicating the file (or the file's data) does not exist in the sensor 309 (or its backend) and is not provided to the sensor 309 (or its backend) except as passively observed from the packet.

Scenario 2

At stage 4, the user drags and drops a file onto the desktop of the user system 311. This generates a file transfer from the file server 303 to the user system 311. The packets which request the file transfer and which actually send the copy of the file can be conventionally known.

Meanwhile, at stage 4.5, the sensor sees the file name and metadata in the packets which request the file transfer and which actually send the copy of the file from the file server 303 to the user system 311. The packets are passively received by the sensor, as they are transmitted from the file server 303 to the user system 311, or vice versa. The sensor 309 (or its backend, as further described herein) can originate a map profile of the file being transferred, merely by passively observing the packet. It is not necessary for the system to have prior information about the file on the file server 303. If the file is already included in a map profile, then the metadata and information newly detected about the file can be added to the map profile.

Optionally, at stage 4.6, the sensor 309 (or its backend) can create a file hash (as discussed further herein) from the copy of the file in the packets which were passively received. As the file is transferred, the sensor 309 can hash to provide the total file hash and a paragraph hash inserted into the file, and stored for later reference by the sensor 309.

At stage 4.7, the sensor 309 (or its backend) can associate the file with the user. The user identity of the user on the user system 311 can be identified, for example, via a log-in identity (if known) and/or IP address, as further discussed herein. The sensor 309 can store an indication in the map profile that the file is associated with the user, and/or can store a user access map associating the user identity with the file and/or the file hash and/or the paragraph hash, and further indicating that the user identity actually touched the file (for example, the user received a copy of the file). Therefore the system has a picture of this individual file.

Now the sensor 309 can start monitoring the passively received packets for the file in motion. For example, the sensor 309 (or its backend) can perform keyword search, and/or search for honey tokens, and the like.

Scenario 3

At stage 6, the user on the user system 311 wants to get a file (which is stored on the user system 311) out to a lot of people. The user system 311 has an IM client; the user drops the file into the IM client and sends it to a friend in Russia (on Network A 301).

Meanwhile, at stage 6.5, the sensor 309 sees the file in the IM packets which actually send the copy of the file from the file server 303 over the network A 301. The packets are passively received by the sensor, as they transition from the user system 311 to the network A 301, or vice versa. The sensor sees the file transfer, recognizes the hashes (if included in the file) and knows the file, recognizes the user, and identifies who the user sends the file to. The sensor notes the file name, the destination and the destination user name, and the user identification which transferred the file. However, it is not necessary for the system to have prior information about the files on the user system 311. The sensor 309 (or its backend, as further described herein) can originate a map profile of the files and file data included in the IM message, merely by passively observing the packets, even for files which the sensor 309 was not aware of before observing the files in the packets. If the sensor already includes this file and metadata in a map profile, the sensor can expand the profile to include information that the file was transferred by an IM client as well as where the file was transferred.

Scenario 4

In Scenario 4, the user wants to e-mail the file to another friend in China. At stage 8, the user drops the file from the user system 311 (as illustrated), or from the file server 303 (not illustrated) onto an e-mail server 305 and the e-mail server 305 will pump it out to the other friend as an e-mail.

At stage 8.5, the sensor sees the file e-mailed to China, and catalogs: who the file is sent to (destination user ID from e-mail), that the file is sent to China (based on destination country code), sent by whom (e.g., source user ID from e-mail), and the method of transfer (by e-mail).

The packets are passively received by the sensor 309, as they transition from the user system 311 to the mail server 305. The sensor sees the e-mail with the attached file, recognizes the hashes (if included in the file) and knows the file, recognizes the user, and identifies who the user sends the file to. The sensor notes the file name, the destination and the destination user name, and the user identification which transferred the file. If the sensor 309 does not have prior information about the file, however, the sensor 309 (or its backend, as further described herein) can originate a map profile of the files and file data included in the e-mail, merely by passively observing the packets with the e-mail. If the sensor already includes this file and metadata in a map profile, the sensor can expand the profile to include information that the file was transferred to the mail server 305 as well as where the file was transferred.

Scenario 5

In this scenario, the user wants to make file available to lots of friends. At stage 9, the user puts the file on a web server 307 (his personal web page) within the network to which the sensor 309 is attached.

At stage 9.5, the sensor 309 sees the file transfer, recognizes the hashes and knows the file, and recognizes that the user is sending a copy of the file to the web server 307.

At stage 9.6, as people come in, sensor can see the file going out from the web server 307. The sensor probably does not know the user ID which is retrieving the file since the file is retrieved from outside the network.

The packets are passively received by the sensor, as they are transmitted to or from the web server 307. The sensor notes the file name and the user identification which transferred the file to the web server 307. The sensor 309 sees the file transfer from the user system 311 to the web server 307, or from the web server 307 to network B 313, recognizes the hashes (if included in the file) and knows the file, and recognizes the user. It is not necessary for the system to have prior information about the files on the user system 311 or the web server 307. The sensor 309 (or its backend, as further described herein) can originate a map profile of the files and file data transferred to or from the web server 307, merely by passively observing the packets, even for files which the sensor 309 was not aware of before observing the files in the packets. If the sensor already includes this file and metadata in a map profile, the sensor can expand the profile to include information indicating how the file was transferred.

The above scenarios illustrate that the system can generate a catalog of the file structure and the file itself, where it has moved around the network, etc. All of this information has been collected.

Now, consider the following example applications of the information which was collected.

(1) The system can evaluate the ability of the user to have access to the information. Is the file in the wrong directory? For example, is a payroll information file and/or stock ownership file in the wrong directory?

(2) The system can evaluate who it is being sent to, and appropriateness of channel user is using: Is it an appropriate channel for this data to be distributed over? Is IM appropriate for potentially sensitive information? Is the receiving user appropriate (e.g., inside the network or outside the network)?

(3) The e-mail server: should the user be e-mailing this file? Is the person in a country (top level domain, e.g., .cn) that is black-listed?

(4) The web server: should data in this file be put on the web server?

There can be a data management back end associated with this kind of collection and inference. The combination of the sensor and data management backend can monitor and correlate (and if in-line can block). For example, the system can have a list of events and the hashes for the file, can notice the file in motion from this device, and can track how the file is being fanned out. From this and other data which is collected, the system can start inferring that something is happening.

Consider another example: Marty creates a file on his desktop and e-mails it to Doug. The system can track that Marty sent the file to Doug, and track who Doug then sends the file to.

The system is creating something new: profiles about the data itself, as well as the data map for the network, and how the data is being used. Over time, as traffic moves, the map/topology of the network gets better.

Figure 5:
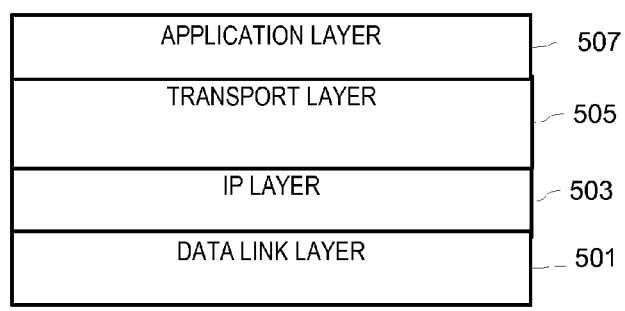
FIG. 5 is a diagram illustrating layers used for packet processing.

Referring now to FIG. 5, a diagram illustrating layers used for packet processing will be discussed and described. FIG. 5 is included to summarize layers that are referenced by one or more embodiments in discussing packet processing. The packet processing layers are well understood in the art. The layers include the application layer 507, the transport layer 505, the IP layer 503, and the data link layer 501. Additional layers can be provided and/or merged together by end points, according to known techniques. The packet is formatted to reflect the layers, as is well known. Hence, when the packet is received and passively observed, a deep inspection can be performed based on the packet format and how the endpoints are expected to have formatted the packet. Deep inspection will not be further discussed, but rather, it is assumed that a deep inspection will be provided which can appropriately find a file, file contents, file header, file information (e.g., directory listing), file name, and the like contained in a packet, whether such data is incorporated into a header portion, message body, or data contents of one or more packets.

Figure 6:
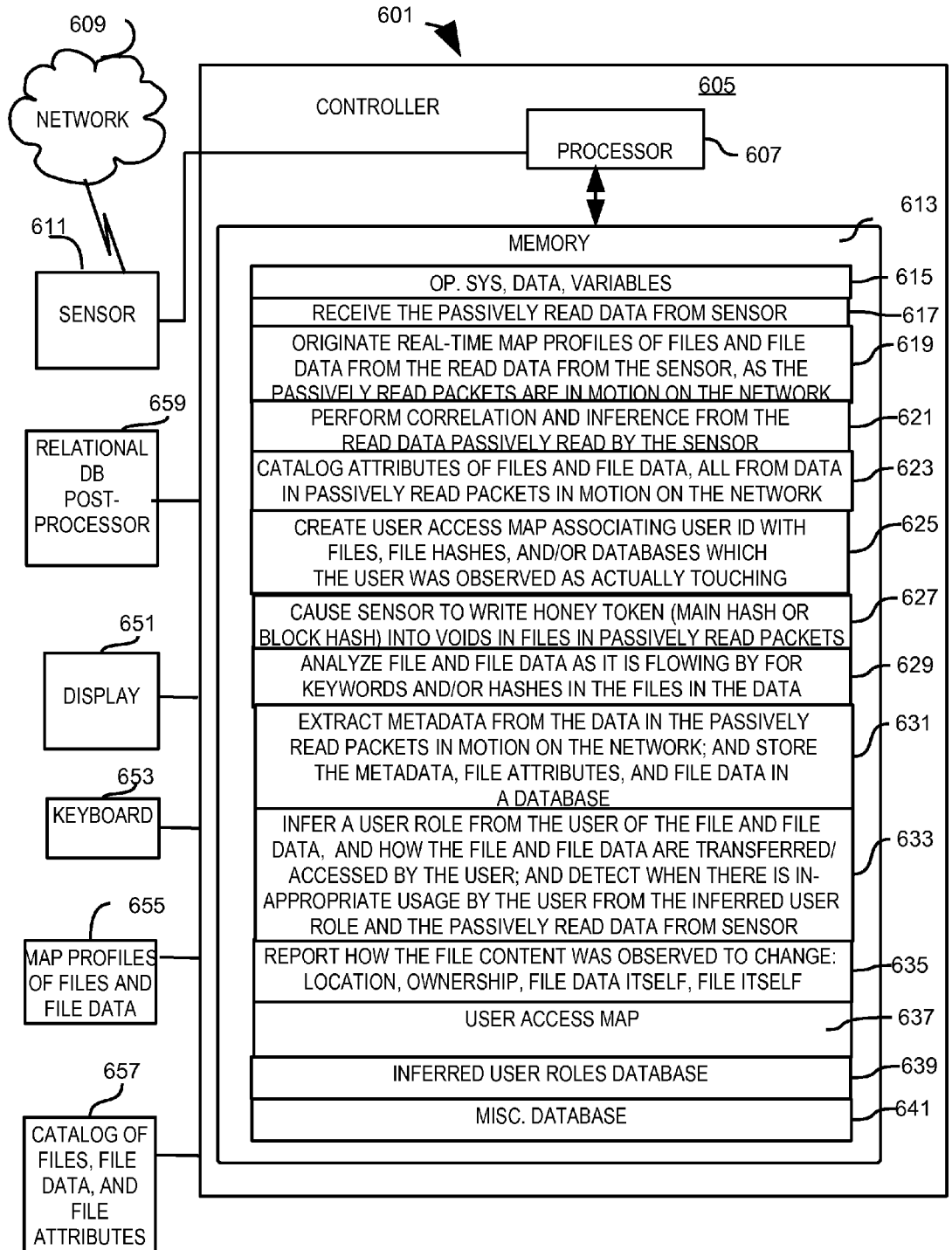
FIG. 6 is a block diagram illustrating portions of an exemplary computer system.

Referring now to FIG. 6, a block diagram illustrating portions of an exemplary computer system will be discussed and described. The computer system 601, sometimes referred to herein as a "system," may include one or more controllers 605, which can receive signals from a sensor 611 which senses communications from a network 609 in accordance with known techniques, where the communications are being sent to a target (not illustrated). The sensor 611 is representative of one or more sensors which can be deployed in accordance with known techniques. The controller 605 can include a processor 607, a memory 613, an optional display 651, and/or an optional user input device such as a keyboard 653. Additional remote or local storage can include map profiles of files and file data 655 and a catalog of files, file data and file attributes 657. An optional relational database post-processor 659 can be included to assist access to the storage 655, 657.

The processor 607 may comprise one or more microprocessors and/or one or more digital signal processors. The memory 613 may be coupled to the processor 607 and may comprise a read-only memory (ROM), a random-access memory (RAM), a programmable ROM (PROM), and/or an electrically erasable read-only memory (EEPROM). The memory 613 may include multiple memory locations for storing, among other things, an operating system, data and variables 615 for programs executed by the processor 607; computer programs for causing the processor to operate in connection with various functions such as to receive 617 passively read data from the sensor, originate 619 real-time map profiles of files and file data, perform 621 correlation and inference from the passively read data, catalog 623 attributes of files and file data from passively read data, create 625 a user access map of files, etc. the user was observed as actually touching, causing 627 the sensor to write honey tokens and/or hashes into files in passively read packets, analyze 629 file and file data as it is flowing by for keywords and/or hashes in the files, extract 631 metadata from the data in the passively read packets in motion on the network, infer 633 a user role from the user of the file and the file data, and how the file and file data is transferred/accessed by the user, and detect when there is inappropriate usage, and report 635 how the file content was observed to change; a user access map 637; an inferred user roles database 639; and a database 641 for other information used by the processor 607. The computer programs may be stored, for example, in ROM or PROM and may direct the processor 607 in controlling the operation of the computer system 601. Much of the interconnection and relationship between the overall memory 613, the processor 607, the sensor 611, the network 609 the display 651, the keyboard 653, and remote/local databases 655, 657 is technology known to one of the skill in the art and will not be discussed herein.

The processor 607 may be programmed to receive 617 passively read data from the sensor 611. In the illustrated example, packets are detected by the sensor 611 connected to the computer system 601 and information in the detected packets are supplied to the computer system 601 in accordance with known techniques. Various techniques can be used to passively read data at the sensor while the data is in motion on the network, for example, packet sniffing. Various known sensor devices can be programmed or otherwise configured to operate as the sniffer 611 discussed herein. The sensor 611 can be electrically or wirelessly connected to the processor 607 so as to be in communication therewith, in accordance with conventional techniques. The sensor 611 and processor 607 which are connected together can mutually communicate with each other, or the sensor 611 can be programmed in transmit only mode to the processor 607.

The processor 607 can be programmed to originate real-time map profiles of files and file data from the data passively read by the sensor 611, as the passively read packets are in motion on the network. A map profile about the files is intended to provide a topographical map of where the files are located. A map profile can include, for example, directory listings of files and file data, locations where files originated from and were transferred to, meta data about the files (e.g., file type, creation date, modified date, created by, owned by, etc.), an indication of the user(s) associated with the file, an indication that the file was transferred or accessed, how it was transferred/accessed, and by/to whom it was transferred/accessed, and possible other information about the file. Because the map profiles are originated at the processor from passively read data in motion on the network, the map profiles can be continually revised and refined as new information is observed from passively read packets in motion on the network. For example, as new files are discovered from passively read packets, they can be added to the real-time map.

The processor 607 may be programmed to perform 621 correlation and inference from the passively read data which was received from the sensor 611. The following are examples of information which can be correlated from the passively read data: file information stored in the catalog of files, a list of events can be constructed for the file to indicate how the file is transferred and/or accessed, a list of users of the file, a list of source(s) of the file and destination(s) of the file, a list of hashes for the file (block hash and/or file hash), a list of honeytokens for the file. The following can be inferred from the passively read data: the places the files are permitted to be can be inferred because they are related to places the files have been, the users that are permitted to access the files can be inferred from the roles of people that had the files, the processes properly used to transfer/transform (e.g., encrypt) the file can be inferred from past processes used to transfer/transform the file, the user role can be inferred from types of data the user transfers/accesses. For example, if the file was previously encrypted and/or sent as a single file, the inference is that it should be encrypted before being transferred, and that the file should not be broken into small blocks before being transferred. The system can infer malicious behavior from, e.g., an activity that fakes out a DLP such as breaking a single file into smaller pieces.

The processor 607 may be programmed to catalog 623 attributes of files and file data from passively read data, which is read by the sensor 611 from packets as they are in motion on the network 609. Attributes of the files can be collected from, e.g., file headers in the passively read data, file directories in the passively read data, database file formats in the passively read data, hosts (as the source of the file) listed in the packet headers, hosts (as the destination of the file) listed in the packet headers, and the like. File data can be collected when it appears in the packets as they are in motion on the network 609. The term "file data" is used herein to indicate data that is inside the file itself, in comparison to a file header.

The processor 607 may be programmed to create 625 a user access map of files, associating the user identifier with files, file hashes and/or databases which the user was observed (from the passively read packets) as actually touching. The user access map 637 can correlate information about the user identifier and the files, file hashes and/or databases which the user sent or received. The user identifier can be unique to the individual user and can correlate a single user with one or more handles, i.e., unique mail addresses or contact numbers, which he or she uses. Available techniques can be used to determine and generate a user identifier.

The processor 607 may be programmed to analyze 629 file and file data as it is flowing by for keywords and/or hashes in the files. Changes to a file can be identified in the following way, for example: decompose the file format and then hash on blocks of the file. For example, hash each paragraph in a WORD file, and then look for those paragraph hashes to occur in other files, and look for changes in that file (based on same file name having some different paragraph hashes). Also, there can be a main file hash ("main file hash" being defined as a hash in which the entire file is hashed) and a block hash ("block hash" being defined as a hash in which a paragraph or data block of the file is hashed). Hashing is known technology. A block hash is useful for determining which block changes, or identifying a block that came from somewhere else.

How static the hashes are is dependent on the file type, e.g., ACROBAT files will tend to be relatively static, WORD documents are edited and tend to change. Note, because the sensor 511 can operate in-line, it can influence the content of files. Also, the voids inside of the files (i.e., stretches of garbage data), can be written as a file traverses the device with a tracker—the file can be modified as it goes by. This is different than what has been done before with tagging because it is done in real time, e.g., this is a WORD document, let's put in a tag and see where the tag goes. One of the in-line sensors 611, e.g., for RDA technology, can be used to do this. As data comes in to the IPS or IDS, the hash can be inserted. The term used in security industry is embedding a "honeytoken". The system can embed the honeytoken in the file and look for the honey token in places where it is not supposed to be.

Hence, the processor 607 may be programmed to cause 627 the sensor to write honey tokens and/or hashes into files in passively read packets. Certain formats are known to have dead data that can be overwritten: Microsoft WORD documents, .pdf documents, Microsoft OFFICE documents. The files that are picked to be tagged can have one of these formats which is predetermined to have dead data that can be overwritten. The sensor can be instructed by the processor 607 to embed a honeytoken into the voids inside files contained in the passively read packets as they are in motion on the network. The honeytoken can then be observed by one or more sensors 611 so the honeytoken can be used to aid tracking of the file's movement around and outside the network.

The processor 607 may be programmed to extract 631 metadata from the data in the passively read packets in motion on the network. The metadata can include, for example, one or more of the following: a main hash of the entire file, a block hash of individual blocks within the file (e.g., paragraph hash of WORD files, data block hash of ACROBAT or OFFICE files), a directory listing of files with file names, dates, time stamps, size, and file owners. The metadata can be stored, for example by the relational database post processor 659, in a relational database.

The processor 607 may be programmed to infer 633 a user role from the user of the file and the file data, and how the file and file data is transferred/accessed by the user, and detect when there is inappropriate usage by the user from the inferred user role and the read data from the sensor. The inferred user roles can be stored in the inferred user roles database 639.

The system can start inferring roles from who is using the data and how they are using it. Consider, for example, that Marty interacts with the main version of the control server, the mail server, and two other servers around the enterprise. The system can note when Marty is interacting with data he has never interacted with before. Or, a particular user's job is XYZ and he should access one type of data, but he is accessing other types of data. The system can infer roles by who is accessing the data, and can infer when a user exceeds permissions. E.g., the legal team should interact with legal type of data, but one person in the legal team is interacting with payroll-type data.

The processor 607 may be programmed to report 635 that the file content was observed to change and/or how the file content was observed to change. The changes which were observed can include, for example, location of the file (source and/or destination), ownership of the file, the file data about the file itself, and/or the file itself. The change can be noted by comparing the file data and file attributes from current passively read data as current information, and comparing the current information about the file with previously observed information about the file, such as can be stored in the map profiles 655 of files and file data and/or catalog 657 of files, file data, and file attributes. The changes can be used to alert, notify, report, and/or the like, or can be used as an event which can trigger a policy rule for the file.

The processor 607 may include store for the user access map 637 and/or the inferred user roles database 639 (each discussed further herein). As an alternative to the illustrated storage in memory 613, one or both the user access map 637 and the inferred user roles database 639 can be stored in an accessible storage (not illustrated) and/or a local or remote database, and/or can be stored in a distributed manner on plural local/remote computer accessible storage media.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Referring now to FIG. 7, a flow chart illustrating a process for real time data awareness will be discussed and described. These procedure for real time data awareness 701 can advantageously be implemented on, for example, a processor of a controller and the procedure for sense data 721 can advantageously be implemented on, for example, a processor of a sensor, both described in connection with FIG. 6 or other apparatuses appropriately arranged. The procedures for real time data awareness 701 and for sense data 721 can be run simultaneously in parallel, so that data can be passively read in real time continuously while packets are in motion, whilst the passively read data is handled.

The sense data procedure 721 can be implemented on a sensor, or similar network appliance, and is described herein first. The sense data procedure 721 can include a loop that will passively read 723 the data, and send 725 the data which was read. More particularly, the procedure 721 can passively read 723 the data in packets as they are in motion on the network between a source and a destination of the packets. Techniques are known for passively reading data in packets as they are in motion on the network. Then, the procedure 721 can send 725 the data which was passively read for further post-sensor analysis. Any of several conventional techniques can be used for sending data to a post-sensor processor.

The real time data awareness procedure 701 can include looping to receive 703 passively read data from a sensor, checking 703 whether the passively read data includes files and/or file data, and if so, handling the files and/or file data 707, 709, 711, 713. The real time data awareness procedure 701 can continuously loop so as to continuously be ready to receive and handle files and/or file data from a sensor.

The real time data awareness procedure can include receiving 703 passively read data, for example, from one or more sensors. The data received from the sensor can be in a format which is predetermined by the sensor, comprising data detected from the packets and/or a summary of data from the packets.

The real time data awareness procedure can include checking 703 whether the passively read data includes files and/or file data. For example, the procedure 701 can check for one or more of the following types of file transfer methods:
- conversations between users such as e-mail, instant message, SMTP (simple mail transfer protocol), LAN messenger, and variations and evolutions thereof, when a file is embedded in or attached to the conversation
- pages being downloaded, when the page includes a file
- e-mail attachments
- file downloads
- file repository accesses
- file transfers such as ftp (file transfer protocol), NFS (network file system), tftp (trivial file transfer protocool), http (hypertext transfer protocol), Bittorrent, Kermit, and other file transfer protocols, variants thereof, and evolutions thereof.

The location and format of the file can differ depending on the type of file transfer method. Accordingly, the determination of whether the passively read data includes files and/or file data can be sensitive to the type of file transfer methods, so as to identify the file depending on the type of file transfer method. For example, a file attached to an e-mail attachment is in a different location and format than a file being transferred via ftp or NFS. Each of these file transfer methods is well defined in respective industry standard or proprietary specifications.

When the passively read data includes files and/or file data, the real time data awareness procedure 701 can handle the files and/or file data, for example by originating 707 real time map profiles; performing 709 correlation and inference; cataloging 711 files/file attributes; and creating 713 a user map. Each of these is discussed further herein, to the extent that it has not been discussed in detail previously.

The real time data awareness procedure 701 can include originating 707 real time map profiles. The real time map profile can map locations of files, to provide a topography map of locations of files on the network. The real time map profile can be developed from information about the file or files, obtained from the passively read packets, such as file name, time stamp, file size, file hash, subhash, server ID that contained the file (IP address), host ID (which contains the file), user ID (indicating user that had the file), destination ID (the place to which the file was transferred), and file directories.

The real time data awareness procedure 701 can include performing 709 correlation and inference. Correlation and inference have been discussed in more detail above.

The real time data awareness procedure 701 can include cataloging 711 files/file attributes. Attributes which can be cataloged and associated with a particular file include direct file data information (e.g., file name, file size, time stamp, file hash, block hashes, server ID that contained the file; host ID which contains the file, user ID who sent it, user ID who is receiving it, place file is transferred to, content of the file (e.g., keywords or hashes, file content changes), where the data is, who has access to the data or file, what device has data on it, how the file was transferred, how the file was transformed (e.g., encrypted)), all of the direct file data information being observed from the data in the packets in motion on the network, obtained from the sensor.

The real time data awareness procedure 701 can include creating 713 a user access map associating user identity with the files, file hashes, and databases the user has actually touched by transferring or receiving. This has been discussed in more detail above.

Moreover, embodiments can include a computer system configured with the foregoing tangible computer-readable medium and/or method(s); and/or a communication network comprising at least one computer system configured with the foregoing computer-readable medium and/or method(s).

It should be noted that the communication networks of interest include those that transmit information in packets in accordance with packet processing protocols, for example, by packet switching networks that transmit data, where the packet(s) are generated by a source, the packets are transmitted, and the packets are routed over network infrastructure devices, which are sent to a destination specified in the packet(s). Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, for example, IPV4 or IPV6, and other wireless application protocols or wireline application protocols and/or other protocol structures, and variants and evolutions thereof. Such networks can provide wireless communications capability and/or utilize wireline connections such as cable and/or a connector, or similar.

The designation "file" is defined herein as a block of arbitrary information, or resource for storing information, which is readable by a computer program and stored in non-transitory electronic memory; a file remains available for programs to use after the current program has finished. Typically, a file has a file name and a path which uniquely locates the file within its storage. Plural files are typically organized within a file directory. The format of a file can be further pre-defined by a file system such as UNIX or WINDOWS or other file systems to include a file header, file data (which is the content of the file), meta data, and/or attributes. The "attributes" of a file can specify operations that can be performed on the file (for example, read, write, hidden, archive, and the like) and/or file name, file size, time stamp, and the like. The designation "file data" is defined herein to mean the content of the file (distinct from the file header, file meta data, and file attributes).

Furthermore, the designation "intrusion detection/prevention system" (and IDS/IPS) is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS"), and the like, and variants or evolutions thereof. An intrusion detection/prevention system may be host-based, or may monitor traffic to a target system using, for example, sensors, anywhere between the target system and the intruder, typically after a final router or firewall.

The designation "in motion on a network" or "in motion on the network" is defined herein to refer to a packet, data in a packet, or a file in a packet that has been transmitted from the source host of the packet and but is observed, read or monitored before that packet has been received at the destination host of the packet.

The designation "packet" is defined herein as a unit of data formatted in accordance with a packet processing protocol such as IPV4 or IPV6, carried by a packet switching network and includes a header and data, and is sometimes referred to as an IP packet or a datagram.

A "passively read" packet is defined herein as a packet which was not elicited or initiated by the processor on which the packet is read. To "passively read" data or a packet is defined herein as to receive a packet which was not elicited or initiated by a prior transmission from the processor on which the packet is read.

The term "real-time" or "real time" is defined herein to mean that the analyzed (input) and/or generated (output) data (whether they are grouped together in large segments or processed individually) can be processed (or generated) continuously in the time it takes to input and/or output the same set of data independent of the processing delay.

The designation "sensor" is defined herein expressly to indicate a device including a processor whose primary functions are to detect and reports network traffic on the network to which it is attached and to detect malicious activity on the network, typically by examining the header and data portions of packets to look for patterns and behavior that suggest malicious activity, are sometimes referred to as a security appliance or sensor appliance, and can be standalone or incorporate one or more of: a firewall, an anti-virus scanning device, a content filtering device, an intrusion detection appliance, an intrusion prevention appliance, a penetration testing appliance, a vulnerability assessment appliance, and the like. The sensor can operate inline (installed as an appliance within the network, so that traffic flows through it); as a tap (network traffic between the clients and servers is copied by the tap to the sensor which is essentially invisible to the other network entities); or in a span (traffic is spanned off either the server side or the client side of a router or switch, copying both the incoming and outgoing traffic from any of the ports). The sensor can collect information on the packets which it sees, and can be configured to transmit the collected packet information for individual packets, summaries of packets, reports, and/or as detected events. Examples of such sensors include a Sourcefire™ sensor, a McAfee™ sensor, and the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system, comprising:
    a sensor configured to:
        passively read data in packets as the packets are in motion on a network;
    a processor, being a hardware processor, cooperatively operable with the sensor, and configured to:
        receive the read data from the sensor;
        originate real-time map profiles of files and file data, both from the read data from the sensor, as the passively read packets are in motion on the network,
        wherein the map profile is a topographical map of locations of the files on the network,
        wherein the map profile further designates hosts which contain the files, destinations to where the files were transferred, and file directories of the files on the hosts and destinations;
        extract metadata from the read data in the passively read packets to generate passively discovered metadata, as the packets are in motion on the network, the read data including: the main hash of the entire file, the block hash of individual blocks within the file, the directory listing of files with file names, dates, time stamps, size, and file owners; the hash being a cryptographic hash unique to the file;
        store the passively discovered metadata, attributes of the files, and the file data, in a relational database; and
        store the passively discovered metadata in a data map of passively discovered metadata.

2. The system of claim 1, wherein the processor is further configured to:
    perform correlation and inference from the read data read by the sensor.

3. The system of claim 1, wherein the processor is further configured to:
    catalog attributes of the files and the file data, all from the read data in the packets in motion on the network.

4. The system of claim 1, wherein the processor is further configured to:
    create a user access map associating user identity with the files, file hashes, and databases the user has actually touched.

5. The system of claim 1, wherein the sensor is further configured to embed a honeytoken into voids inside the file contained in the passively read packets when the file has a file format predetermined to have dead data that can be overwritten, and to use the honeytoken to aid tracking of the file's movement around and outside the network.

6. The system of claim 1, wherein the processor further examines the read data from the sensor for the files and the file data, when the read data is a conversation between users, a page being downloaded, an e-mail attachment, a file download, a file repository access, and a file transfer via the network.

7. The system of claim 1, wherein the relational database is based around the file itself and indicates where the file has been transferred and who transferred it.

8. The system of claim 1, the relational database being implemented as a postprocessor to the sensor.

9. The system of claim 1, wherein the processor is further configured to:
    infer a user role from who is using the file and the file data and how the user is transferring or accessing the file and the file data; and
    detect when the user is performing an inappropriate usage from the inferred user role and the read data from the sensor.

10. The system of claim 1, wherein the processor is further configured to:
    report on how a content of the file has changed, the changes including location reflected in the file data, ownership reflected in the file data, changes in the file data itself, and changes in the file itself.

11. The system of claim 3, wherein the attributes which are cataloged include: file name, file size, time stamp, file hash, block hashes, server ID that contained the file, host ID which contains the file, user ID who sent it, user ID who is receiving it, place file is transferred to, content of the file, where the file data is, who has access to the file data or the file, what device has the file data on it, how the file was transferred, how the file was transformed.

12. The system of claim 11, wherein the content of the file which is cataloged comprises: keywords, hashes, and file content changes.

13. The system of claim 11, the content of the file being determined by analyzing the file and the file data as it is flowing by for keywords or hashes in the files in the data.

14. The system of claim 5, wherein the honeytoken that is embedded in the file is one of a main hash of the entire file, and a block hash of an individual block within the file.

15. The system of claim 6, the file repository access being a download, an ftp transfer, a file share access, or an NFS access.

16. A method, comprising:
in a sensor, passively reading data in packets as the packets are in motion on a network;
in a processor, being a hardware processor, receiving the read data from the sensor;
originating real-time map profiles of files and file data from the read data, both from the sensor, as the passively read packets are in motion on the network,
wherein the map profile is a topographical map of locations of the files on the network,
wherein the map profile further designates hosts which contain the files, destinations to where the files were transferred, and file directories of the files on the hosts and destinations;
extracting metadata from the read data in the passively read packets to generate passively discovered metadata, as the packets are in motion on the network, the read data including: the main hash of the entire file, the block hash of individual blocks within the file, the directory listing of files with file names, dates, time stamps, size, and file owners; the hash being a cryptographic hash unique to the file;
storing the passively discovered metadata, attributes of the files, and the file data, in a relational database; and
storing the passively discovered metadata in a data map of passively discovered metadata.

17. The method of claim 16, further comprising:
performing correlation and inference from the data retrieved by the sensor.

18. The method of claim 16, further comprising:
cataloging attributes of the files and the file data, all from the read data in the packets in motion on the network.

19. The method of claim 16, further comprising:
creating a user access map associating user identity with the files, file hashes, and databases the user has actually touched.

20. A non-transitory computer-readable storage medium comprising computer-executable instructions for performing the steps of:
passively reading, from a sensor, data in packets as the packets are in motion on a network;
receiving, in a processor, the read data from the sensor;
originating real-time map profiles of files and file data, both from the read data from the sensor, as the passively read packets are in motion on the network,
wherein the map profile is a topographical map of locations of the files on the network,
wherein the map profile further designates hosts which contain the files, destinations to where the files were transferred, and file directories of the files on the hosts and destinations;
extracting metadata from the read data in the passively read packets to generate passively discovered metadata, as the packets are in motion on the network, the read data including: the main hash of the entire file, the block hash of individual blocks within the file, the directory listing of files with file names, dates, time stamps, size, and file owners; the hash being a cryptographic hash unique to the file;
storing the passively discovered metadata, attributes of the files, and the file data, in a relational database; and
storing the passively discovered metadata in a data map of passively discovered metadata.

21. The non-transitory computer-readable storage medium of claim 20, further comprising:
performing correlation and inference from the read data read by the sensor.

22. The non-transitory computer-readable storage medium of claim 20, further comprising:
cataloging attributes of the files and the file data, all from the read data in the packets in motion on the network.

23. The non-transitory computer-readable storage medium of claim 20, further comprising:
creating a user access map associating user identity with the files, file hashes, and databases the user has actually touched.

* * * * *